(12) United States Patent
Chen et al.

(10) Patent No.: US 9,318,914 B2
(45) Date of Patent: Apr. 19, 2016

(54) WIRELESS CHARGING DEVICE

(71) Applicants: CHAMP TECH OPTICAL (FOSHAN) CORPORATION, Foshan (CN); Foxconn Technology Co., Ltd., New Taipei (TW)

(72) Inventors: Hai-Lin Chen, Foshan (CN); Di-Qiong Zhao, Foshan (CN); Ching-Hsing Huang, New Taipei (TW); Yung-Ping Lin, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 170 days.

(21) Appl. No.: 14/049,225

(22) Filed: Oct. 9, 2013

(65) Prior Publication Data

US 2015/0054450 A1    Feb. 26, 2015

(30) Foreign Application Priority Data

Aug. 23, 2013  (CN) .......................... 2013 1 03717581

(51) Int. Cl.
| | |
|---|---|
| *H02J 7/00* | (2006.01) |
| *H02J 7/02* | (2006.01) |
| *H01F 38/14* | (2006.01) |
| *H04B 5/00* | (2006.01) |

(52) U.S. Cl.
CPC ................. *H02J 7/025* (2013.01); *H01F 38/14* (2013.01); *H04B 5/0081* (2013.01)

(58) Field of Classification Search
CPC ........................................................ H02J 7/025
USPC .......................................................... 320/108
See application file for complete search history.

(56) References Cited

U.S. PATENT DOCUMENTS 8,541,977 B2    9/2013  Hasegawa et al.
2009/0096413 A1*  4/2009  Partovi et al. ................. 320/108

FOREIGN PATENT DOCUMENTS

TW          200924634       6/2009

* cited by examiner

*Primary Examiner* — Edward Tso
*Assistant Examiner* — Ahmed Omar
(74) *Attorney, Agent, or Firm* — Novak Druce Connolly Bove + Quigg LLP

(57) ABSTRACT

The present disclose relates to a wireless charging device for charging a portable electronic device. The wireless charging device includes a charging panel, a transmitting unit and a heat dissipation unit. The charging panel includes a first surface and a second surface opposite to the first surface, the first surface supports the portable electronic device, and the portable electronic device includes a top surface away from the charging panel. The transmitting unit includes a coil for generating electromagnetic signals for charging the portable electronic device. The heat dissipation unit includes a base and a pressing portion connected to the base. The base thermally contacts the second surface of the charging panel, and the pressing portion thermally contacts the top surface of the portable electronic device.

11 Claims, 5 Drawing Sheets

WIRELESS CHARGING DEVICE

BACKGROUND

1. Technical Field

The disclosure relates to a charging system, and particularly to a wireless charging device.

2. Discussion of Related Art

With the continued improvements in the field of Information Technology (IT) and the increasing prevalence of a wide variety of portable electronic products, a variety of techniques have been developed that supply power for portable electronic products. Technology for supplying power typically used a power line in the past. However, wireless power transmission technology, which is capable of wirelessly supplying power, has recently been developed.

Wireless power transmission technology includes technology for delivering electrical energy in the form of electromagnetic waves, electromagnetic induction, or electromagnetic resonance, for example. Wireless power transmission technology makes it possible to supply power wirelessly anytime and anywhere, without the use of power lines, such as, electric wires. During operation, the wireless charging device and the portable electronic products are easy to generate heat. The heat may damage the wireless charging device and the portable electronic products if cannot be dissipated timely.

Therefore, what is needed is a wireless charging device which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present light emitting diode device for microminiaturization. Moreover, in the drawing, like reference numerals designate corresponding parts throughout the whole view.

DETAILED DESCRIPTION OF EMBODIMENTS

Figure 1:
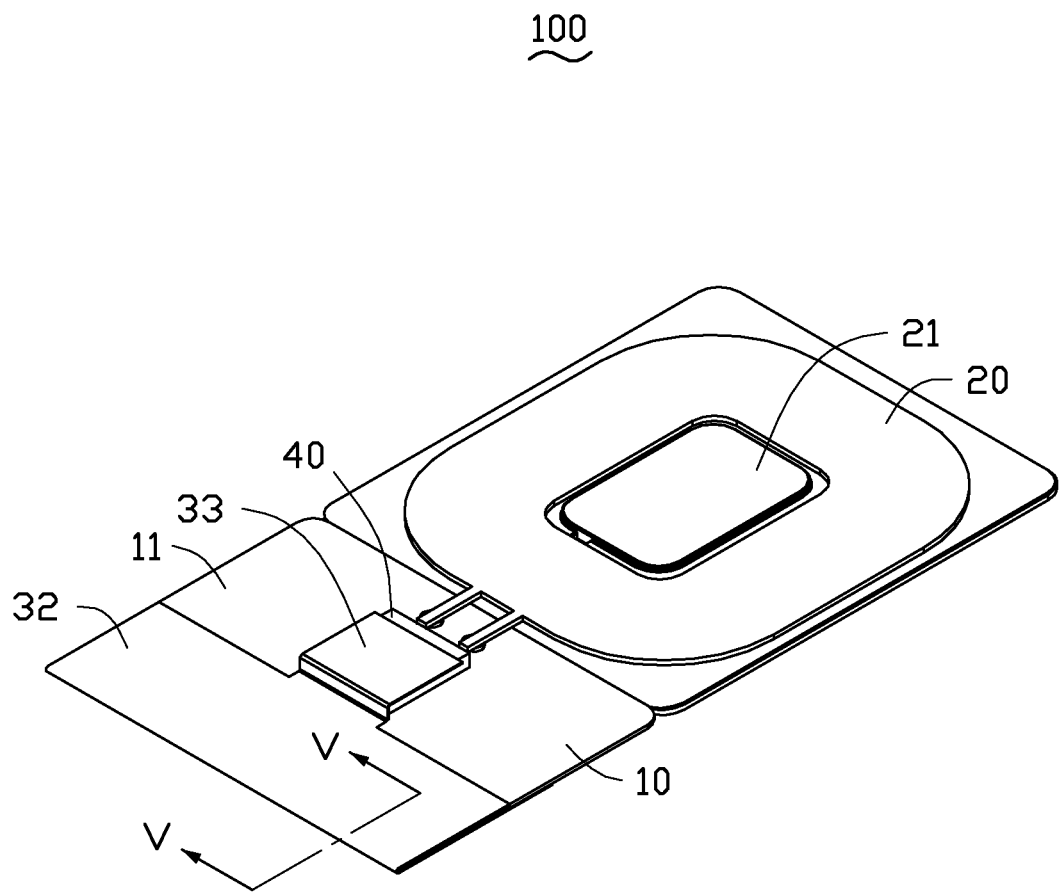
FIG. 1 is a schematic, isometric view of a wireless charging device according to an exemplary embodiment.
Figure 2:
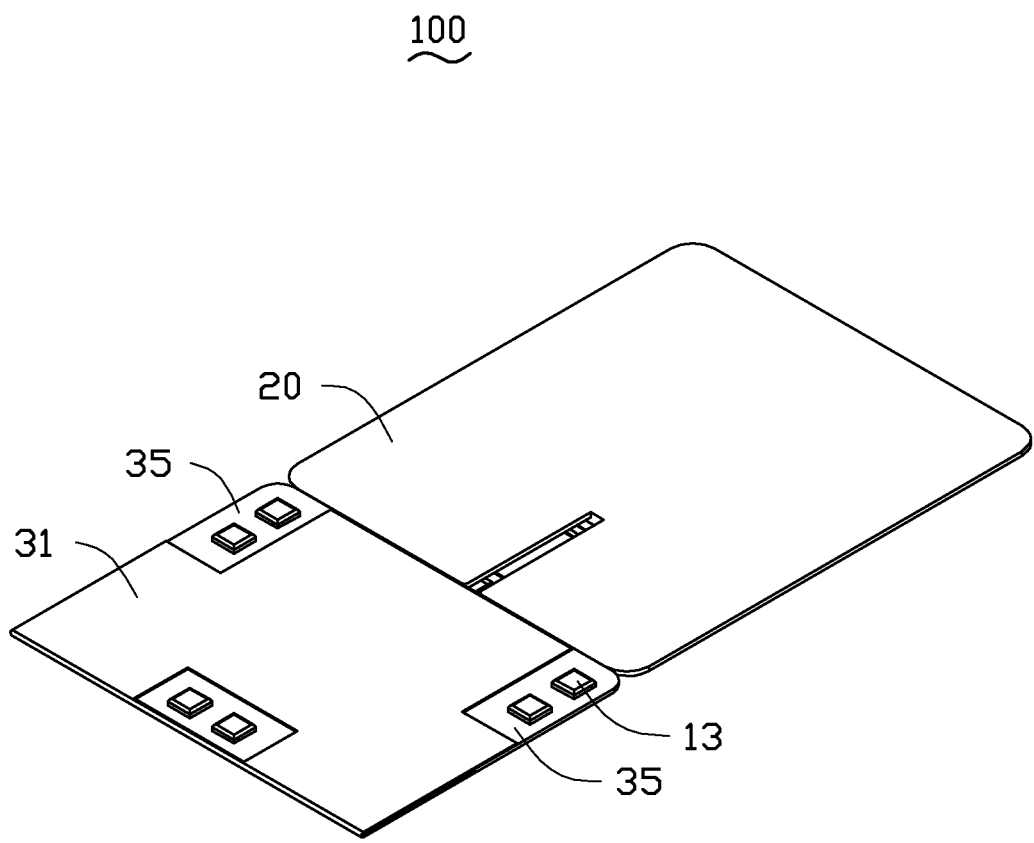
FIG. 2 is an inverted view of the wireless charging device of FIG. 1.
Figure 3:
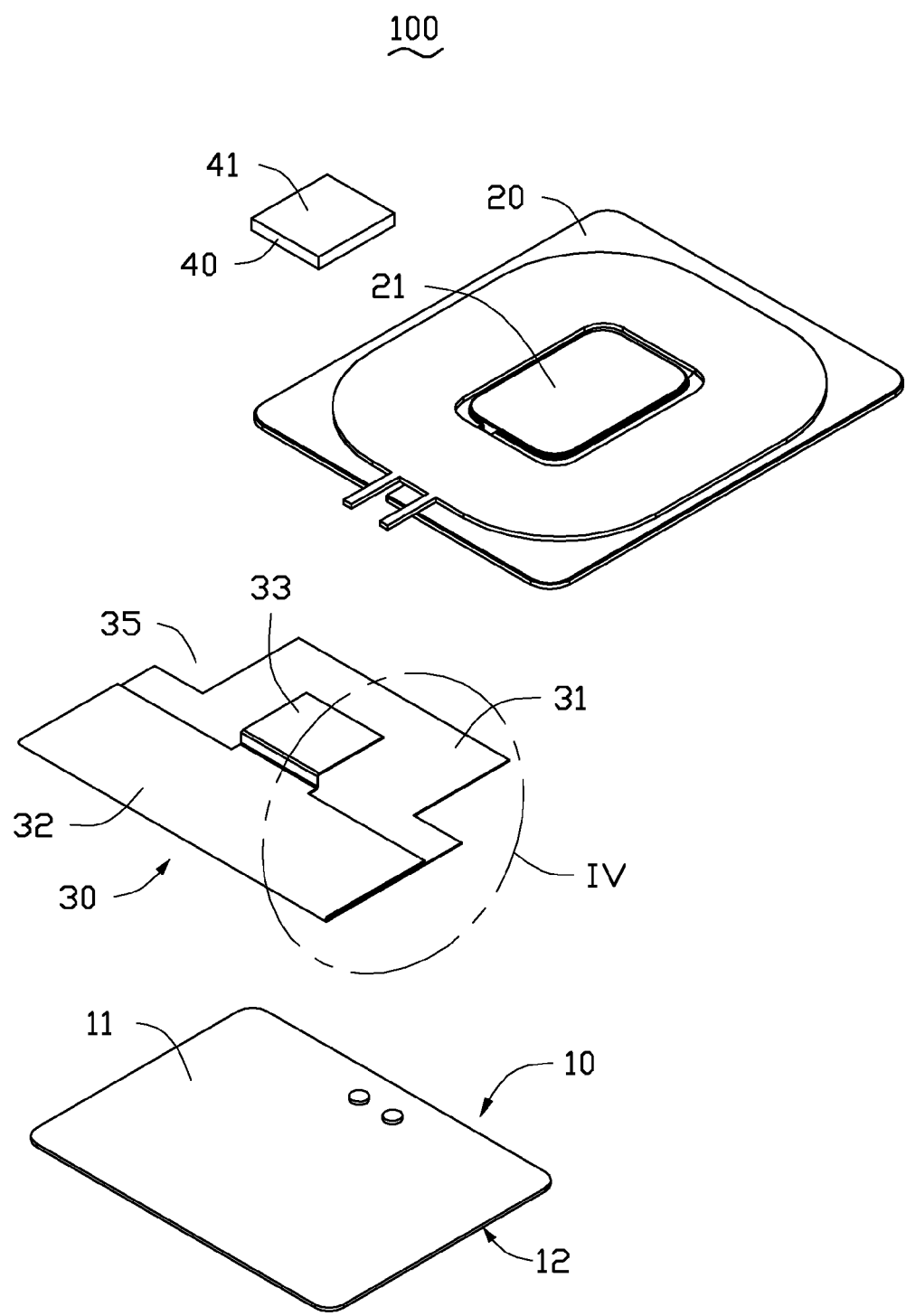
FIG. 3 is a disassembled view of the wireless charging device of FIG. 1.

Referring to FIGS. 1 to 3, a wireless charging device 100 in accordance with an exemplary embodiment of the present disclosure is illustrated. The wireless charging device 100 is used for charging a portable electronic device 40 such as mobile phone. The portable electronic device 40 has a top surface 41. The wireless charging device 100 includes a charging panel 10, a transmitting unit 20 and a heat dissipation unit 30.

The charging panel 10 includes a first surface 11 and a second surface 12 opposite to the first surface 11. The first surface 11 supports the portable electronic device 40 thereon. A plurality of current contacts 13 are arranged on the second surface 12 of the charging panel 10. In the present embodiment, the charging panel 10 includes six current contacts 13, wherein every two of the current contacts 13 form a group, and the three groups cooperatively define a triangle shape.

The transmitting unit 20 includes at least one coil 21 to generate electromagnetic signals. In the present embodiment, the transmitting unit 20 is electrically connected to an external power source for generating electromagnetic signals. The transmitting unit 20 can includes one, two, or more than two coils.

Figure 4:
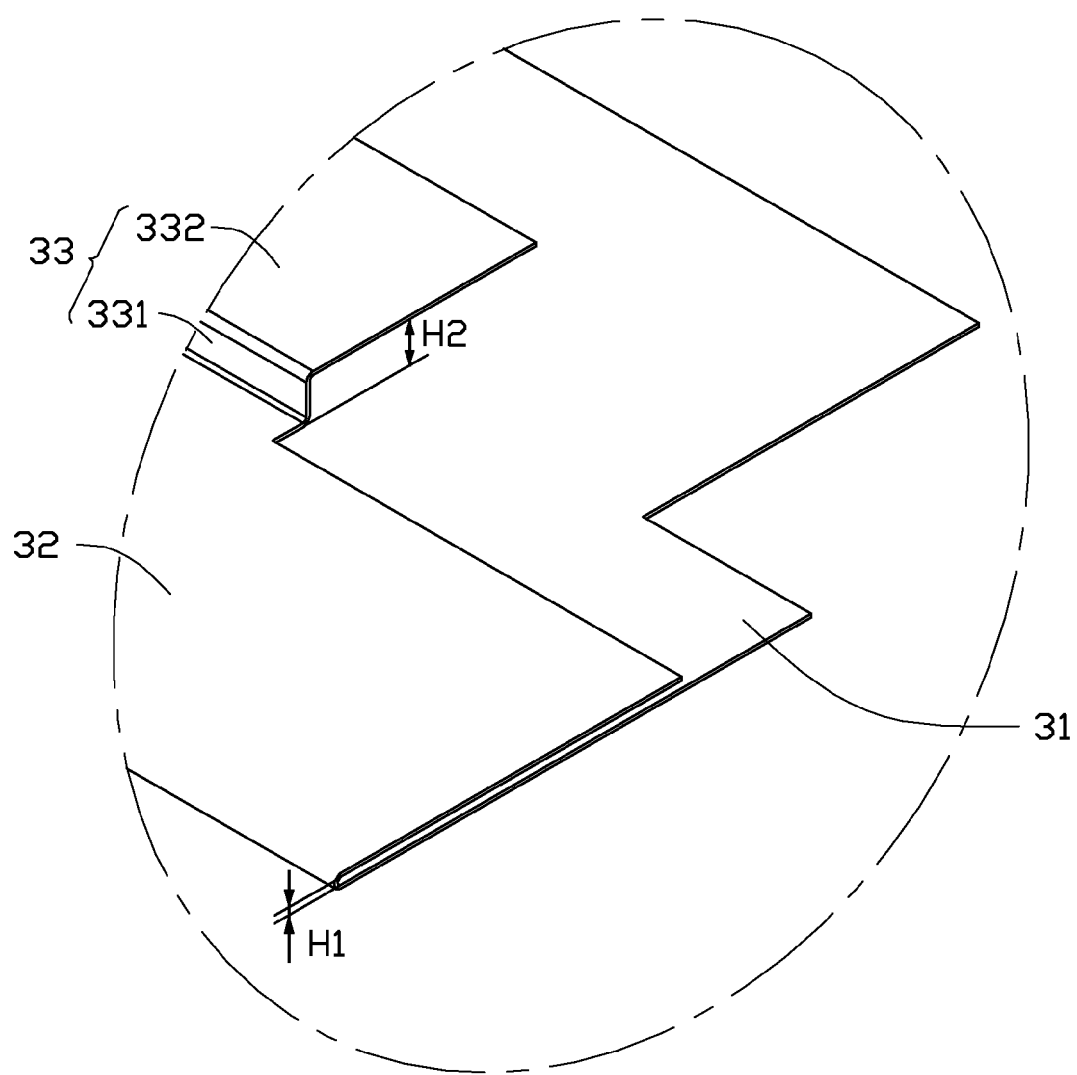
FIG. 4 is an enlarged view of a part IV of FIG. 3.
Figure 5:
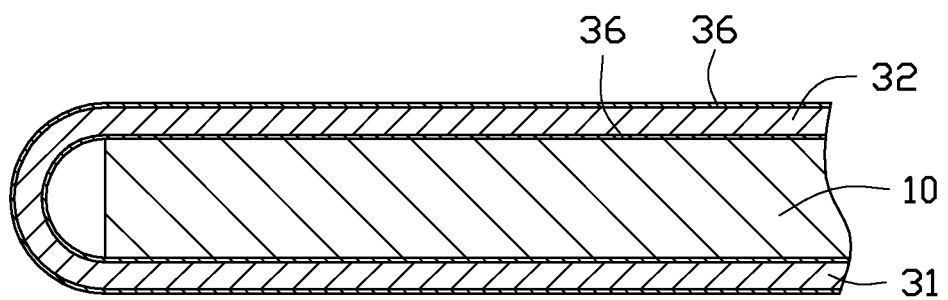
FIG. 5 is a cross-sectional view of the wireless charging device of FIG. 1, taken along line V-V thereof.

Referring to FIG. 4, the heat dissipation unit 30 includes a base 31, a pressing portion 33 and a connecting portion 32 connected to the base 31 and the pressing portion 33. The base 31 connects the second surface 12 of the charging panel 10. The pressing portion 33 presses the top surface 41 of the portable electronic device 40. The connecting portion 32 extends upwardly from an end of the base 31, and then extends horizontally and parallel to the base 31. The pressing portion 33 is substantial L-shape, includes a supporting part 331 extending upwardly from an end of the connecting portion 32 and a pressing part 332 extending horizontally from an end of the supporting part 331 and parallel to the base 31. In the present embodiment, the supporting part 331 is perpendicular to the base 31 and the pressing part 332. A distance H1 between the base 31 and the connecting portion 32 is less than a distance H2 between the base 31 and the pressing part 332. In other words, the pressing part 332, the supporting part 331 and the connecting portion 32 cooperatively define a ladder shape. In the present embodiment, the base 31 defines three cutouts 35 corresponding to the three groups of the current contacts 13 of the charging panel 10; therefore, the current contacts 13 are exposed downwardly from the base 31. The heat dissipation unit 30 is made of a material of high heat conductivity, such as graphite or copper. In the present embodiment, the heat dissipation unit 30 is made of graphite, and two insulation layers 36 are formed on an outer surface and an inner surface of the heat dissipation unit 30. Each insulation layer 36 can be made of polyethylene terephthalate (PET) for insulating.

When using the wireless charging device 100, the portable electronic device 40 is arranged on the charging panel 10 for being charged. The charging panel 10 is located between the base 31 and the connecting portion 32, and the portable electronic device 40 is located between the charging panel 10 and the pressing part 332 of the pressing portion 33. In other words, the base 31 thermally contacts the second surface 12 of the charging panel 10, and the pressing part 332 of the pressing portion 33 thermally contacts the top surface 41 of the portable electronic device 40. Therefore, heat generated by the charging panel 10 and the portable electronic device 40 can be dissipated by the base 31 and the connecting portion 32 of the heat dissipation device 30. Thus, the wireless charging device 100 has great heat dissipating capability.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A wireless charging device for charging a portable electronic device, comprising:

a charging panel comprising a first surface and a second surface opposite to the first surface, the first surface supporting the portable electronic device, the portable electronic device comprising a top surface away from the charging panel;

a transmitting unit comprising a coil for generating electromagnetic signals for charging the portable electronic device; and a heat dissipation unit comprising a base and a pressing portion connected to the base, the base thermally contacting the second surface of the charging panel, the pressing portion thermally contacting the top surface of the portable electronic device, and the base and the pressing portion clamping the portable electronic device sandwiched therebetween.

2. The wireless charging device of claim 1, wherein the pressing portion is connected to the base via a connecting portion, the connecting portion extending upwardly from an end of the base and then extending horizontally and parallel to the base.

3. The wireless charging device of claim 2, wherein the pressing portion comprises a supporting part extending upwardly from an end of the connecting portion and a pressing part extending horizontally from an end of the supporting part.

4. The wireless charging device of claim 2, wherein the pressing part is parallel to the base.

5. The wireless charging device of claim 3, wherein the supporting part is perpendicular to the base and the pressing part.

6. The wireless charging device of claim 3, wherein a distance between the base and the connecting portion is less than a distance between the base and the pressing part.

7. The wireless charging device of claim 1, wherein the heat dissipation unit is made of graphite.

8. The wireless charging device of claim 7, wherein an insulation layer is formed on an inner surface of the heat dissipation unit.

9. The wireless charging device of claim 8, wherein the insulation layer is made of polyethylene terephthalate.

10. The wireless charging device of claim 1, wherein the heat dissipation unit is made of copper.

11. The wireless charging device of claim 1, wherein the charging panel is located between the base and the connecting portion, and the portable electronic device is located between the charging panel and the pressing portion.

* * * * *